May 17, 1949. H. L. BOWDITCH 2,470,333
ZERO ADJUSTMENT MEANS
Filed June 2, 1945
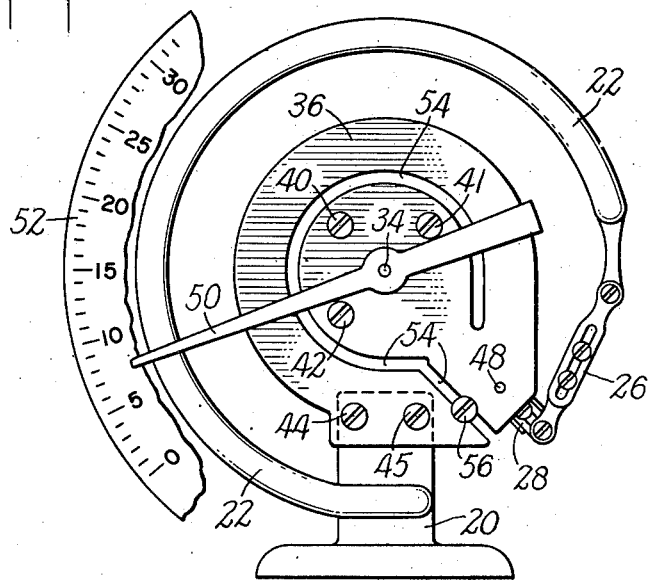
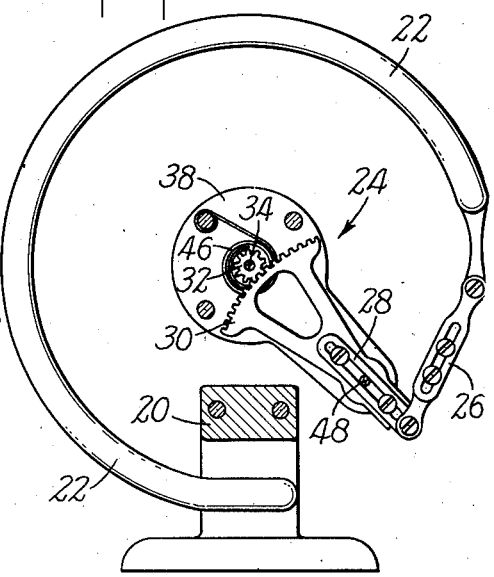
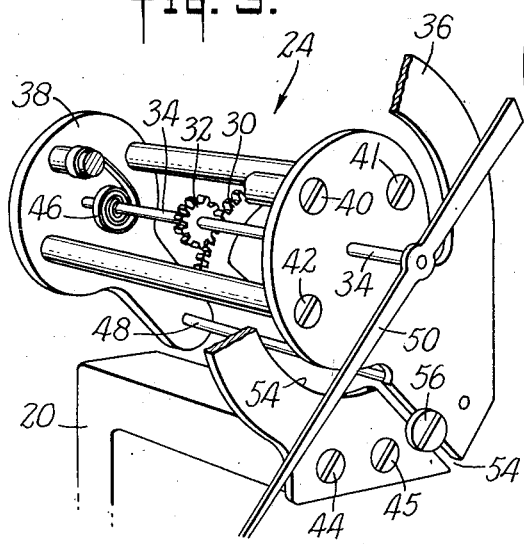
INVENTOR
Hoel L. Bowditch
BY
Blair, Curtis & Hayward
ATTORNEYS Patented May 17, 1949

2,470,333

UNITED STATES PATENT OFFICE 2,470,333

ZERO ADJUSTMENT MEANS

Hoel L. Bowditch, Sharon, Mass., assignor to The Foxboro Company, Foxboro, Mass., a corporation of Massachusetts Application June 2, 1945, Serial No. 597,356

2 Claims. (Cl. 73—415)

This invention relates to indicating instruments. More particularly it pertains to constructions whereby the zero or null position of a pointer or other indicator may be adjusted with respect to the corresponding zero or null graduation of a graduated scale. The present invention not only provides for convenient factory adjustment and alignment, but also provides a rapid realignment of the parts to correct for errors which may find their way into the instrument during use.

For purposes of explaining the invention, it will be described in relationship to pressure gauges of the type wherein a pointer moves over a graduated scale in response to movement of the free end of a Bourdon tube. It is to be understood, however, that the invention might also be applied to other types of indicating instruments wherein a visual means moves with respect to a scale in response to a condition or quantity to be indicated.

In conventional pressure gauges a pointer rotates over a graduated dial about a centrally located pointer shaft. The angular relationship of the pointer shaft with respect to the dial is determined by movements of the free end of a Bourdon tube which is responsive to the pressure condition to be indicated. Ordinarily the free end of the Bourdon tube rotates the pointer shaft by means of a concatenation of links and levers, the shaft itself being turned through a pinion gear by a lever-operated, pivotally mounted sector gear. It has been common in the past to provide an adjustably movable pivot for this sector gear for moving the pointer with respect to the scale. With such pivot adjustments it is possible to reposition the pointer if the instrument is strained or distorted by improper use or overranging.

Various constructions have been suggested for making it possible for a maintenance operator to realign the pointer by adjusting the pivot of the sector gear. It has already been recognized that a good adjusting mechanism should be so located that the pointer might be repositioned without disassembling the gauge. In most past constructions a supporting frame carrying the pivots for the sector gear was provided which was movable about the axis of the pointer shaft itself, so that the pivot point for the sector gear might be swung in an arc which had as its center an axis coinciding with the axis of the pointer shaft. To accomplish this it was necessary to provide a nicely made mechanism.

Bourdon movements as such are relatively small and they do not possess great power. Hence in mounting the sector gear it was essential that it always be truly meshed with a pinion gear on the pointer shaft if the pointer shaft were to follow accurately throughout the entire range. The adjustment mechanism had to be sufficiently well-made that the relatively fine teeth of the gears would continue to mesh properly regardless of adjustments to the position of the pivot point of the sector gear. The movement of the sector gear pivot points had to be through a very accurately controlled path in order that the meshing of the parts should remain free from friction or lateral thrust upon the pointer shaft.

Heretofore these gauge adjustment constructions have, therefore, required relatively well-made parts and precise methods of assembly operations. They have not always been such as could be easily adjusted by an ordinary plant maintenance man. And it has been common for the various parts to become slightly misaligned, thus imposing undue wear and inaccuracies upon the gauge. It is an object of the present invention to provide an accurate adjustment construction susceptible to mass production methods in which the foregoing and other well-known operational difficulties are overcome.

Other objects will be in part pointed out as the description proceeds and will in part become apparent therefrom.

In the accompanying drawings:

Figure 1 is an elevational view of a gauge construction embodying the invention with parts broken away and removed;

Figure 2 is a view similar to that of Figure 1 with additional parts broken away and removed; and, Figure 3 is a perspective view of a portion of the mechanism.

In Figures 1 and 2, base 20 rigidly supports the fixed end of a conventional Bourdon tube pressure sensitive element 22. The free end of Bourdon tube 22 is connected to the gauge movement, generally indicated at 24, through adjustable link 26 and lever 28. The movement 24 consists of sector gear 30 engaging pinion 32 on pointer shaft 34, which is journalled in spring plate 36 and backing plate 38. Plates 36 and 38 are spaced apart by suitable columns and are held in place by screws 40, 41 and 42. Plate 36 is rigidly mounted on base 20 by screws 44 and 45. Hairspring 46, bound to shaft 34 and a supporting column, takes up the backlash between sector gear 30 and pinion 32. Lever 28 and sector gear 30 are held in alignment by adjustment screws by means of which the multiplication of the movement may be regulated in a conventional manner not a part of this invention. Link 28 and sector gear 30 are adjustably secured together and are pivotally mounted on a pivot pin 48.

Pointer 50 is mounted by a tapered press fit on shaft 34 which projects through a journal bearing in plate 36. Shaft 34 also passes through a hole in dial 52 mounted in an instrument case (not shown) and having a suitable scale by which the pointer indication may be read.

The aligning or zeroing mechanism includes a slot 54 provided in a plate 36 in which a tapered screw 56 is inserted. Plate 36 is constructed from metal having the characteristic of a spring. And this inherent springiness, together with its slotted construction makes it, in effect, an adjustable plate with the slot acting to provide a region of narrower cross-section which acts as a flexure. Turning screw 56 acts to change the opening of slot 54, thereby changing the position of the pivot pin 48 supporting the sector gear 30.

In carrying out the practice of the invention the shape of slot 54 has been selected so as to minimize and render negligible translatory motion of shaft 34 while making the adjustment. This is accomplished by cutting the slot so that screw 56 may be located as close as possible to base 20 and pivot pin 48. The curved shape of the slot provides for rotating movement of the center of plate 36 when screw 56 is adjusted. Then by making the axis of the shaft 34 and the center of rotation of the flexure section concentric, adjustment of screw 56 imparts substantially no translatory motion to shaft 34.

The adjustment is effected as follows: When tapered screw 56 is turned, for example in a clockwise direction, slot 54 is distended and plate 36 is distorted. This distortion moves the pivot pin 48 of the sector 30, thereby causing the sector 30 to assume a new angular position with respect to the free end of the Bourdon tube which remains stationary. This change of relationship causes the sector 30 to pivot, turn the pinion gear 32, and the pointer 50, and thereby realign or readjust the position of the pointer 50 with respect to the corresponding position of the free end of the Bourdon tube.

If tapered screw 56 is provided with a left-hand thread, the above described motion is of course reversed, and motion of pointer 50 is in the same direction of rotation as motion of screw 56.

It is to be observed that the construction described has the advantage that zeroing adjustment may be accomplished with speed and facility. The necessity for even partial dismantling of the instrument may be eliminated by making the tapered screw accessible through a suitable hole in the dial.

From the foregoing it will be seen that a device made in accordance with the present invention is well adapted to attain the ends and objects hereinbefore set forth, and to be economically manufactured, since the whole combination is suited to common production methods and is susceptible to a wide latitude of variations as may be desirable in adapting the invention to different applications.

As many embodiments may be made of the above invention, and as many changes are possible in the embodiment described, it is to be understood that all matter hereinbefore set forth in the specification or shown in the accompanying drawings is to be interpreted as illustrative and not in a limiting sense.

I claim:

1. In an indicating apparatus of the character described, in combination, a support, responsive means mounted on said support and movable to positions in response to changes in a variable condition, a supporting plate portion, a shaft rotatably supported by said plate portion and rotatable about a first axis, a lever pivotally supported by said plate portion and rotatable about a second axis spaced from the first axis, said lever being mechanically connected to said responsive means and to said shaft whereby movement of said responsive means rotates said shaft, an arcuate spring strip for supporting said plate portion from said support and being flexible to provide for arcuate movement of said second axis about said first axis as a center without imparting translatory movement to said first axis, whereby movement of said plate portion and second axis adjusts the rotational relationship of said shaft and said responsive element, and means for adjusting the strain of said spring strip to adjust said rotational relationship.

2. In indicating apparatus of the character described including a graduated scale, a pointer, a pointer shaft rotatably mounted for movement about an axis to move said pointer with respect to said scale, means responsive to a condition the value of which is to be indicated, and a driving mechanism connected between said responsive means and said pointer shaft for causing the pointer to move in accordance with movement of said responsive means, the combination with said apparatus of: a supporting frame for supporting said pointer shaft and said driving mechanism, circular spring plate means having an axis coincident with the axis of said pointer shaft and fixed at one end and supporting at its other end said supporting frame, means for moving the supporting end of said plate means with respect to its fixed end and the circular construction of said spring plate means serving to impart substantially pure rotation to said frame and pointer shaft as the fixed and supporting ends of said circular plate are relatively moved whereby to adjust the zero position of said pointer with respect to said scale independently of movement by said responsive means.

HOEL L. BOWDITCH.

REFERENCES CITED

The following references are of record in the file of this patent:

UNITED STATES PATENTS

| Number | Name | Date |
| --- | --- | --- |
| Re. 20,830 | Seegers | Aug. 16, 1938 |
| 1,835,044 | Heise | Dec. 8, 1931 |
| 2,344,882 | Kahn | Mar. 21, 1944 |